UNITED STATES PATENT OFFICE.

FÉLIX GARDAIR AND THADDÉ GLADYSZ, OF MARSEILLES, FRANCE.

MANUFACTURE OF ANHYDROUS ALUMINA.

SPECIFICATION forming part of Letters Patent No. 282,878, dated August 7, 1883.

Application filed March 13, 1883. (Specimens.) Patented in France September 12, 1882, No. 151,103, and in England October 23, 1882, No. 5,030.

*To all whom it may concern:*

Be it known that we, FÉLIX GARDAIR and THADDÉ GLADYSZ, citizens of France, residing at Marseilles, in the Republic of France, have invented new and useful Improvements in the Manufacture of Anhydrous Alumina, (for which we have received Letters Patent in France, No. 151,103, dated September 12, 1882, and in England, No. 5,030, dated October 23, 1882,) of which the following is a specification.

The invention consists of three main operations, viz: first, the preparation of sulphate of alumina; second, the precipitation of alumina of chlorhydric acid; third, the decomposition of chlorhydrate of alumina or chloride of aluminum.

1. *Preparation of sulphate of alumina.*—This sulphate is prepared by submitting pale bauxite, while warm, to the action of sulphuric acid of different degrees of concentration. For this purpose sulphuric acid of 60° Baumé is used, and, with bauxite, alum-cake is obtained; but acid of 25° to 30° Baumé is always to be preferred. The mixture of acid and bauxite is brought to a boil, and kept at this temperature long enough to secure the perfect saturation of the acid, when the solution is clarified by separating the silica and the alumina not acted upon, either by decanting or filtration.

2. *Precipitation of alumina by chlorhydric acid.*—The limpid sulphate of alumina is first concentrated to 30° to 35° Baumé. As soon as the sulphate is cold it is submitted to the action of cold chlorhydric gas. The reaction of the chlorhydric gas upon the aluminous solution is sharp, and there is a considerable escape of heat. Very soon there may be perceived the small crystals of chlorhydrate of alumina, which, in consequence of their great specific weight, fall to the bottom of the absorbing-tanks. When the liquid sulphate of alumina can no longer absorb chlorhydric gas, the operation may be looked upon as finished. Almost the whole of the alumina is therefore found precipitated in the form of chlorhydrate of aluminum. The mother-water, consisting of a mixture of sulphuric and chlorhydric acids, may be employed in other applications upon bauxite. On the application of heat, and in proportion as the sulphuric acid becomes more concentrated, the chlorhydric gas being distilled is conducted into absorbing-tanks to precipitate more alumina. By proceeding under the conditions above mentioned, and with the chlorhydric gas almost dry, ninety-five per cent. of the alumina contained in the sulphate is precipitated. The crystals of chlorhydrate of alumina are separated from their mother-water by simple filtration in closed vessels. For this purpose, however, apparatus may be used in which filtration is effected by means of compressed air or a vacuum. The chlorhydrate of alumina should finally be cleared and dried.

3. *Decomposition of chlorhydrate of alumina.*—As soon as the crystals have been properly dried calcination is proceeded with. Strictly speaking, dark red is sufficient to cause decomposition. The result of this division is that on the one hand white anhydrous alumina, free from silica, and containing only slight traces of oxide of iron, is obtained, and on the other hand chlorhydric gas, which is conducted into the absorbing-tanks. This decomposition is accomplished either in a muffle-oven or in a reverberatory gas-furnace.

It will be seen that in this process the two reagents employed in extracting the pure alumina from its ore become continually and excessively regenerated. Although theoretically a given quantity of the two mineral acids may serve indefinitely in practice, it will be necessary to introduce small quantities of the two reagents regularly, so as to compensate for the loss unavoidable in all industrial operations; but in any case this loss will be reduced to a minimum, and will depend as much upon the perfection of the apparatus as in the care taken in the operation.

We are aware that alumina has been precipitated from solutions of alum salts by the action of chlorhydric-acid gas and heat, as described by Hensgen, and we therefore do not broadly claim such application of said acid gas.

Having thus described our invention and the manner of carrying it into effect, we claim and desire to secure by Letters Patent—

The process of manufacturing anhydrous alumina consisting in preparing crystals of chlorhydrate of aluminum by the reaction of chlorhydric-acid gas upon a solution of sulphate of aluminum, and then decomposing these crystals by the action of heat.

In testimony whereof we have hereunto set our hands and seals in the presence of two subscribing witnesses.

FÉLIX GARDAIR. [L. S.]
THADDÉ GLADYSZ. [L. S.]

Witnesses:
P. TERT,
BMY. LAMY.